US012320162B2

(12) United States Patent
Barron

(10) Patent No.: US 12,320,162 B2
(45) Date of Patent: Jun. 3, 2025

(54) LOCK MECHANISM

(71) Applicant: Zeal Innovation Ltd, Swansea (GB)

(72) Inventor: Neil A. Barron, Swansea (GB)

(73) Assignee: Zeal Innovation Ltd, Swansea (GB)

( * ) Notice: Subject to any disclaimer, the term of this patent is extended or adjusted under 35 U.S.C. 154(b) by 1147 days.

(21) Appl. No.: 17/260,848

(22) PCT Filed: Jul. 16, 2019

(86) PCT No.: PCT/GB2019/051983

§ 371 (c)(1),
(2) Date: Jan. 15, 2021

(87) PCT Pub. No.: WO2020/016568

PCT Pub. Date: Jan. 23, 2020

(65) Prior Publication Data

US 2021/0270061 A1 Sep. 2, 2021

(30) Foreign Application Priority Data

Jul. 16, 2018 (GB) ...................................... 1811628

(51) Int. Cl.
*E05B 73/00* (2006.01)
*E05B 67/00* (2006.01)
*E05B 71/00* (2006.01)

(52) U.S. Cl.
CPC ........ *E05B 73/0005* (2013.01); *E05B 67/003* (2013.01); *E05B 71/00* (2013.01)

(58) Field of Classification Search
CPC .... E05B 73/00; E05B 73/0005; E05B 67/003; E05B 71/00; Y10T 70/40; Y10T 70/5009
(Continued)

(56) References Cited

U.S. PATENT DOCUMENTS 5,706,679 A 1/1998 Zane et al.
6,510,717 B1 1/2003 Levi
(Continued)

FOREIGN PATENT DOCUMENTS

CN 203570023 4/2014
CN 107476679 A 12/2017
(Continued)

OTHER PUBLICATIONS

Korean First Examination Report for corresponding Korean Application No. 10-2021-7004437, 10 pages.
(Continued)

*Primary Examiner* — Suzanne L Barrett
(74) *Attorney, Agent, or Firm* — Dority & Manning, P.A.

(57) ABSTRACT

A security lock comprises a slide with a bolt section along a side thereof and integral therewith, and a casing having a channel with an open side for receiving and retaining the bolt section. The bolt section and channel have substantially the same cross-section to allow for sliding engagement of the bolt section in the channel to a hold position. The bolt section has a recess with at least one defined axial boundary on its surface, aligned when the bolt is in the hold position with an opening in the wall of the channel. A cam and follower mechanism is mounted in the lock in which the cam is rotatable in the casing to at least one hold orientation at which the follower extends in the opening and into the recess when the bolt section is in the hold position to restrict movement of the bolt section along the channel. A key device can rotate the cam between at least one hold orientation and at least one other release orientation at which the follower can withdraw from the recess and release the bolt section in the channel.

24 Claims, 5 Drawing Sheets

(58) Field of Classification Search
USPC ........................................................ 70/14, 58
See application file for complete search history.

(56) References Cited

U.S. PATENT DOCUMENTS

| | | | |
|---|---|---|---|
| 7,047,772 B2 | 5/2006 | Yu | |
| 2005/0235708 A1 | 10/2005 | Ling | |
| 2016/0153214 A1 | 6/2016 | Castro | |
| 2017/0280831 A1 | 10/2017 | Ritchie | |
| 2018/0279805 A1 * | 10/2018 | Galant | F16M 11/041 |
| 2021/0270061 A1 * | 9/2021 | Barron | E05B 73/0005 |

FOREIGN PATENT DOCUMENTS

| | | | |
|---|---|---|---|
| DE | 20002685 U1 | 5/2000 | |
| FR | 2712624 | 5/1995 | |
| JP | 3017305 | 10/1995 | |
| JP | 2006016796 | 1/2006 | |
| NL | 1017815 | 10/2002 | |
| NL | 1017815 C2 * | 10/2002 | B62H 5/003 |
| WO | WO 2008/016563 A1 | 2/2008 | |
| WO | WO 2010/103327 | 9/2010 | |
| WO | WO 2015/087067 | 6/2015 | |
| WO | WO 2020/002931 | 1/2020 | |

OTHER PUBLICATIONS

PCT International Preliminary Report on Patentability for corresponding PCT Application No. PCT/GB2019/051983, issued on Jan. 19, 2021, 9 pages.
PCT International Search Report and Written Opinion for corresponding PCT Application No. PCT/GB2019/051983, mailed on Sep. 23, 2019, 11 pages.
UK Search Report for corresponding Application No. GB1811628.5, dated Jan. 2, 2019, 1 page.

* cited by examiner

LOCK MECHANISM

This application is a national phase application of International Application No. PCT/GB2019/051983 filed on Jul. 16, 2019, which, in turn, is based upon and claims the right of priority to GB Patent Application No. 1811628.5 filed on Jul. 16, 2018, the disclosures of both of which are hereby incorporated by reference herein in their entirety for all purposes.

This invention relates to lock mechanisms, and has particular application in security devices in which two ends of an elongate element such as a strap or chain must be held together. Such devices can be used for securing baggage and light vehicles in the manner described in various Patent publications including International Specification Nos. WO2010/103327 and WO2015/087067; and US U.S. Pat. Nos. 5,706,679 and 6,510,717, the disclosures whereof are hereby incorporated by reference.

The aim of the present invention is to provide a lock mechanism that offers greater resistance to lock breaking tools of the kind that are used to break security devices in the theft of property, and particularly in the theft of cycles, motorcycles and other vehicles that are temporarily parked. According to the invention a lock comprises a slide with a bolt section along a side thereof and integral therewith, and a casing having a channel with an open side for receiving and retaining the bolt section. The bolt section and channel have substantially the same cross-section to allow for sliding engagement of the bolt section in the channel to a hold position. The bolt section has a recess with at least one defined axial boundary on its surface, aligned when the bolt is in the hold position with an opening in the wall of the channel. A cam and follower mechanism is mounted in the lock in which the cam is rotatable in the casing to at least one hold orientation at which the follower extends in the opening and into the recess when the bolt section is in the hold position to restrict movement of the bolt section along the channel. Means such as a key device are provided for rotating the cam between at least one hold orientation and at least one other release orientation at which the follower can withdraw from the recess and release the bolt section in the channel. However, rotation of the cam can be accomplished by a variety of devices including conventional key and tumbler locks.

The slide and casing of a lock according to the invention can be readily and securely coupled to opposite ends of an elongate element such as a chain or strap to create a security device that can be used to attach a bicycle for example to a fixed assembly, or to lock elements relative to each other to prevent movement. A preferred method of attaching the components of a lock of the present invention to such a strap is described in our pending International Patent Application No. PCT/GB2019/051829 filed on 27 Jun. 2019, the entire disclosure whereof is hereby incorporated by reference. However, other techniques can be used, such as welding or crimping. In some applications adhesives can be used.

The recess on the bolt section surface is normally in the form of a slot extending perpendicular to the bolt section axis. It will usually have a part spherical cross-section, suitable to match a cam follower in the form of a ball bearing, but other cross-sections can be used particularly if greater depth is needed. Whatever shape is chosen, the cam follower must be shaped to suit it. Movement of the follower is normally restricted within the opening in the casing, typically by the shape of the opening and follower. In one example the opening can be formed with a flange that prevents the follower from escaping. In another the follower may be formed with lateral tails which can move in slots in the casing opening, which allow the follower to move in the opening, but prevent it from leaving.

The bolt section will typically have a circular or part-circular cross-section, but others can be adopted, normally with a smooth continuous boundary. It can though be polygonal, with rectangular or triangular polygonal cross-sections being preferred. In order to retain the bolt section, the jaws of the matching cross-section of the channel must of course enclose the bolt section to prevent its lateral withdrawal, and when the cross-section is circular the channel wall extends beyond the diameter of the bolt section to hold it in place. Typically, the cross-section of the channel extends around at least 250°, preferably at least 270°. The thickness of the slide body away from the bolt section will normally be less than the parallel dimension of the bolt section, and usually have parallel sides.

In order to further enhance the security of the lock, the channel in the casing may have a lateral extension forming jaws for receiving a matching enlarged section or junction between the bolt section and the slide body. Multiple pairs of jaws may be formed along the length of the channel, but normally a single pair will extend the full length of the channel. The cross sections of the junction and the lateral extension or jaws can be respectively the same or less than those of the bolt section and channel but are preferably larger, and are typically part-circular, polygonal or splined. The lateral extension of the channel makes access to the open side of the channel more difficult and, particularly when its cross section is greater than that of the channel, facilitates the use of an increased amount of material in the jaws of the channel imparting additional resistance to being opened.

In preferred embodiments of the invention the axes of the channel and the bolt section are straight, and the rotational axis of the cam is parallel to that of the channel. However, this is not essential, and the rotational axis of the cam May be at an angle, typically a right angle, to that of the channel.

The cross-section of the cam in the cam and follower mechanism is normally predominantly circular with at least one depression which, when aligned with the recess when the bolt section is in the hold position, can receive the follower and allow the bolt section to be withdrawn. A spring, or other resilient element, can be housed in the recess to urge the follower out of the recess to engage the follower with the bolt such that it enters the recess in the bolt section as soon as the bolt section reaches the hold position. By this means the bolt section can be loosely held in the hold position before the cam follower is locked in the recess by rotation of the cam. One or both circumferential edges of the depression may form a step to create a sudden movement of the follower when the cam reaches its hold orientation, but one or both edges can be bevelled or curved to create a more smooth transition. In an alternative arrangement the cam is formed with at least one projection for urging the follower into the recess when the bolt section is in said hold position. The axial edges of the recess in the bolt section will usually be formed as a step to secure the restriction of the movement of the bolt section in the channel from its hold position.

To facilitate the introduction of the bolt section into the channel the end of the bolt section can be bevelled. This is of particular value when the cam follower is resiliently urged into the channel as it will enable the bolt section to force its way past the follower into the hold position where it will thereby be held pending activation of the key or other means for turning the cam to lock the bolt section in the hold position.

In a lock according to the invention the channel will normally have a proximal open end for receiving the bolt section, and a distal closed end. This blocks access to the distal end of the channel when the bolt section is in its hold position. To block access to the proximal end the corresponding end of the bolt section may be formed with a flange that extends around the end. When the bolt section forms the side of a block as described above, access to the channel is blocked from all sides.

The elements of locks according to the invention will normally be metal, typically steel. As the locking elements preventing withdrawal of the bolt section along the channel are within the casing, and shear forces are applied when an attempt is made to withdraw the bolt section, these might be made in other materials such as plastics materials.

To further secure the bolt section in the channel in a lock according to the invention the bolt section and channel may both be formed with a plurality of splines that interdigitate when the bolt section is received in the channel. Such splines can extend substantially the length of the bolt section and channel. This does of course prevent or at least restrict rotation of the bolt section in the channel. In one alternative arrangement with a similar effect the distal end of the bolt section and the closed end of the channel could have matching castellations that interdigitate when the bolt reaches the hold position. In yet another alternative, the face of the proximal end of the channel is formed with castellations and a flange at the end of the bolt section is formed with matching castellated features that interdigitate with the channel face castellations when bolt section is in the hold position. It will be appreciated that these arrangements can be used independently or in combination.

The invention will now be described by way of example and with reference to the accompanying schematic drawings wherein.

Figure 1:
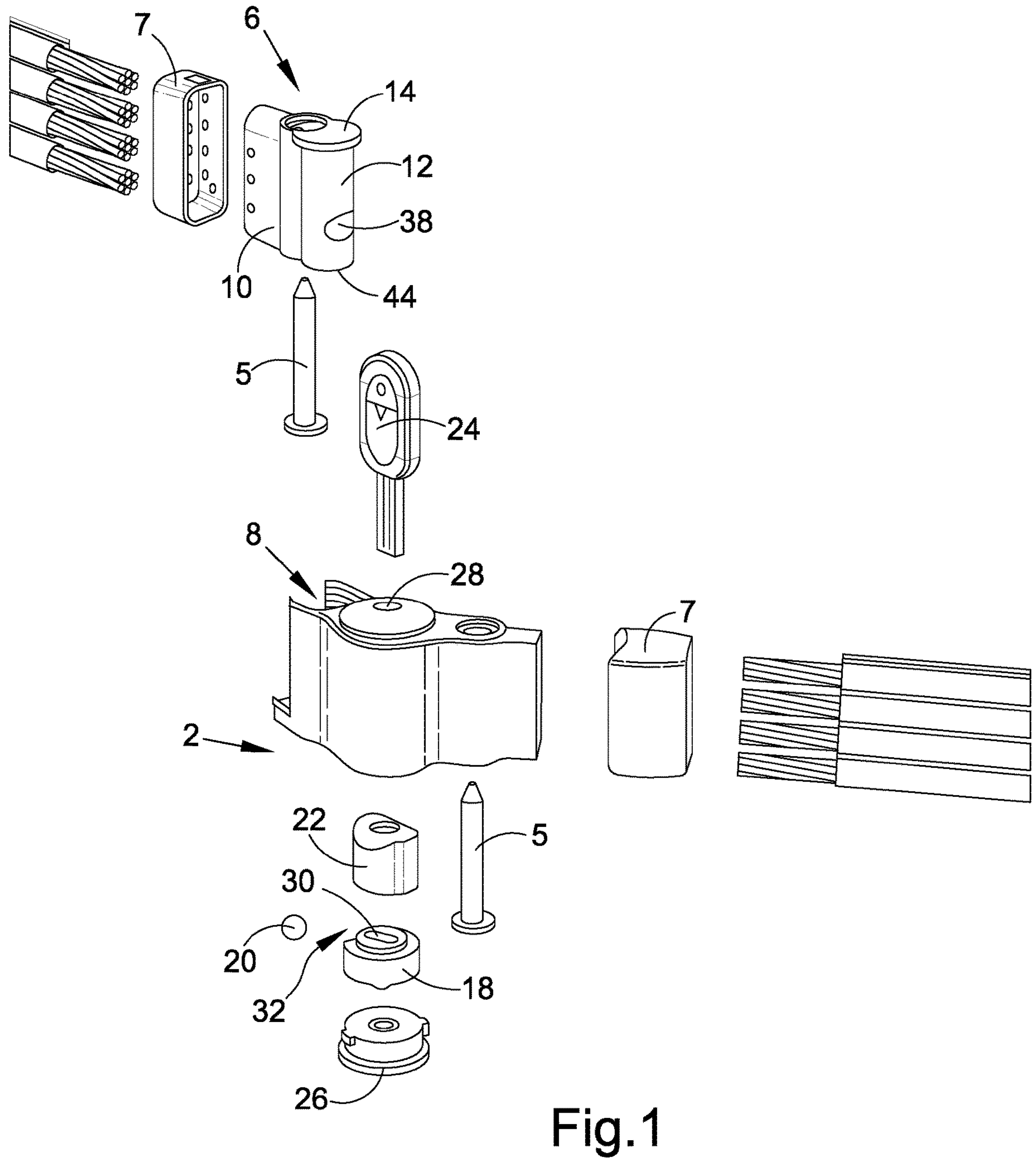
FIG. 1 is an exploded perspective view of a lock according to the invention.
Figure 9:
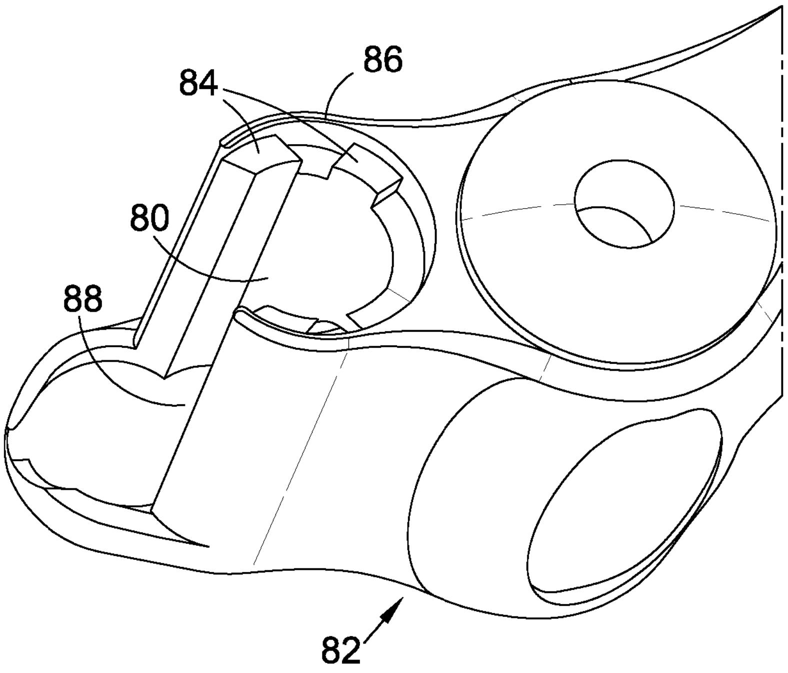
FIG. 9 is a perspective view of the upper end of part of the casing in another lock according to the invention.
Figure 10:
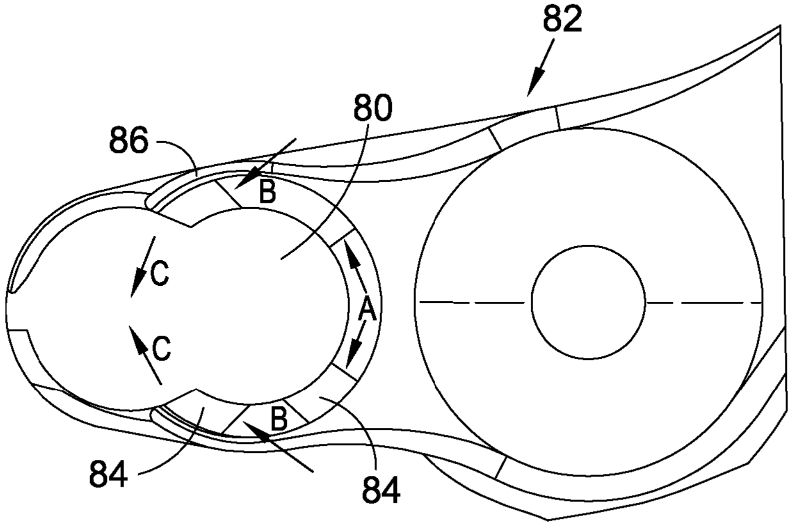
Figure 11:
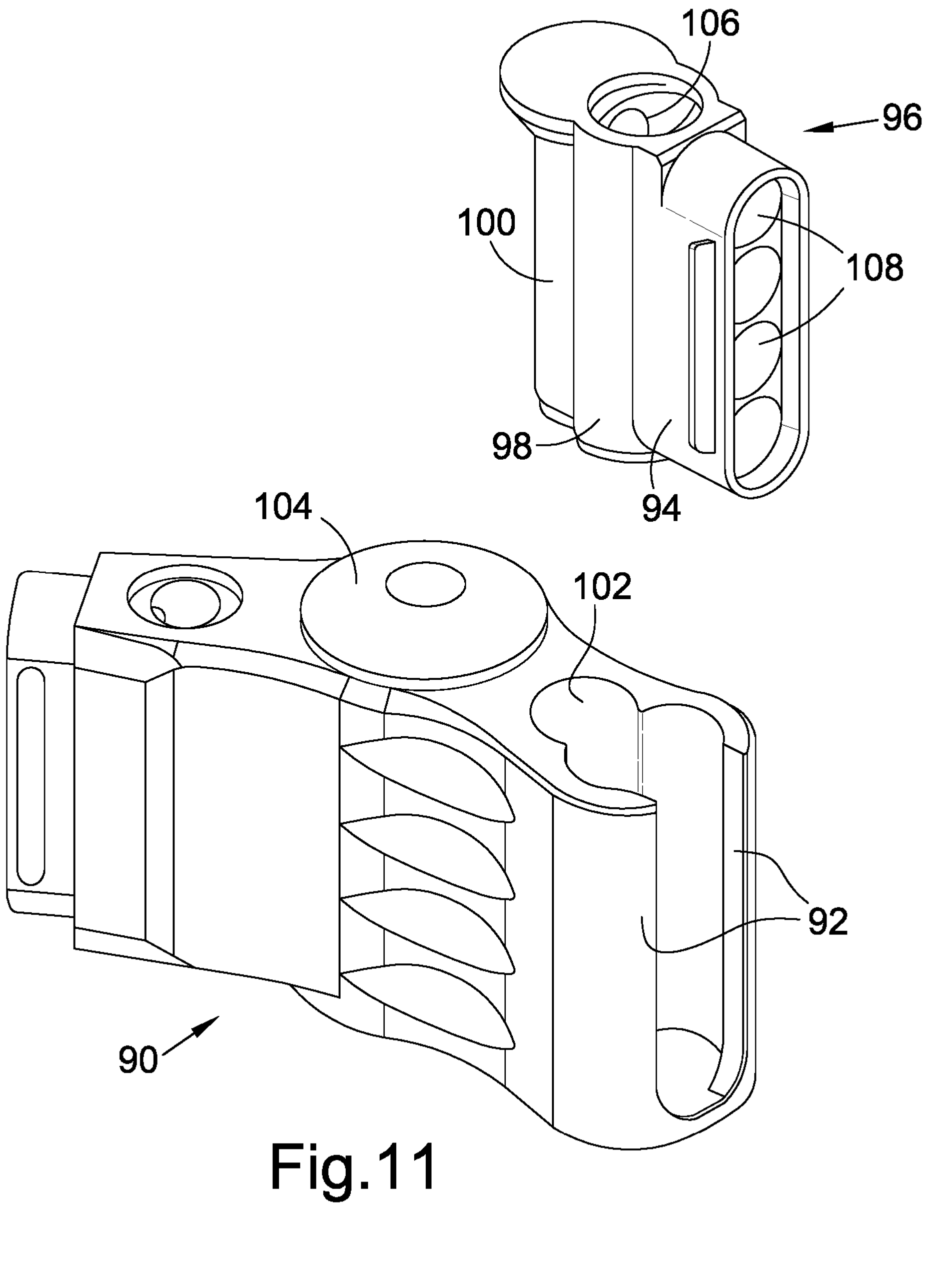

FIG. 10 indicates forces that develop when an attempt is made to extract a slide in a lock of the kind illustrated in FIG. 9, from the casing; and FIG. 11 is an exploded perspective view of a lock casing and slide similar to that shown in FIG. 1, but modified for additional security.

Figure 2:
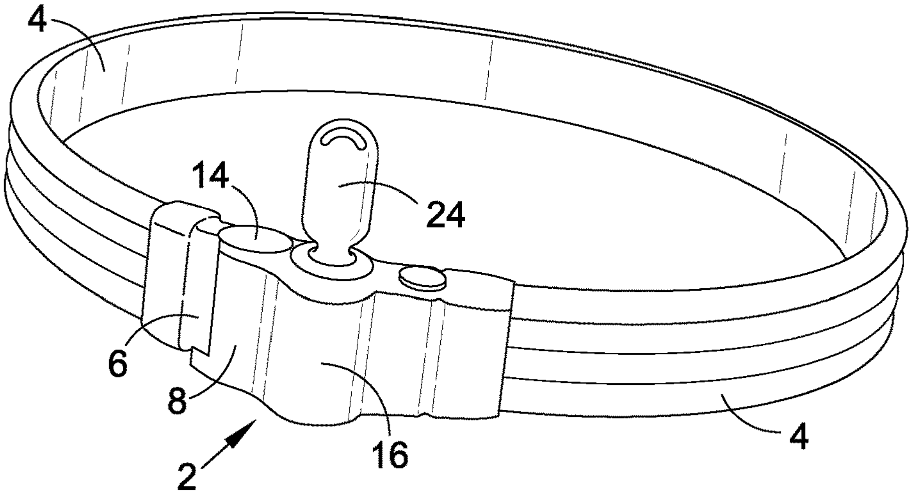
FIG. 2 shows the lock of FIG. 1 holding two ends of strap thereby forming a security device.

The basic component of the lock shown in FIGS. 1 and 2 is the casing 2. The right side as seen is adapted to receive the cables at one end of a strap 4 which may be held therein by an attachment of the kind describe in our co-pending International Patent Application No. PCT/GB2019/051829 referred to above using pins 5. The cables at the other end of the strap 4 are similarly held in the slide 6 of the lock of the present invention. The engagement of the cables in the casing 2 at one end of the strap 4, and in the slide 6 at the other is covered by sleeves 7.

The left side as seen of the casing 2 forms an open sided channel 8 closed at its lower distal end and open at its upper proximal end. The cross-section of the channel 8 is circular. The slide 6 is in the form of a block 10 along one side of which extends a bolt section 12. The junction between the block 10 and the bolt section 12 is enlarged to accommodate the pin 5 holding the ends of the cables in the block. The cross-section of the bolt section 12 matches that of the channel 8 to enable it to slide into and in the channel, and its length also matches that of the channel such that when it is fully engaged in the channel the proximal end of the channel is closed by the flange 14 to prevent access thereto. The cross section of the channel 8 is part-circular, its jaws extending around 270° to its open side, with a radius of around 11 mms. The extent and radius of the cross section of the bolt section 12 are slightly less, enabling it to slide in the channel with minimal or no lateral movement. The thickness of the slide block 10 itself is around 8 mms.

A cylindrical chamber 36 is formed in the central section 16 of the casing which houses a cam (18) and follower (20) mechanism and a device 22 for operating the mechanism. The device 22 can be a conventional tumbler lock for example, and it will not be described in detail, but a key 24 is shown for operating the device 22. The cam and follower mechanism and the device 22 are held in the central section 16 by a closure 26. An opening 28 provides access for the key 24 to the device 22.

Figure 3:
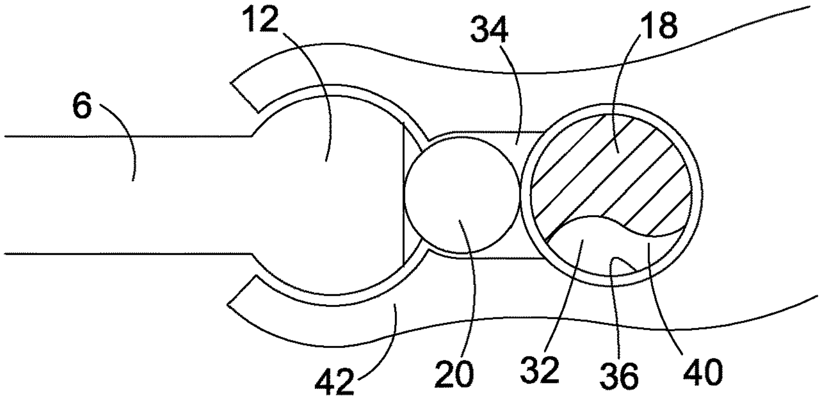
FIG. 3 is a cross-section through a lock similar to that of FIG. 1 showing the how the cam follower engages the bolt section of the slide in the hold position.

As can be seen, the overall cross-section of the cam 18 is circular, allowing it to rotate in the cylindrical chamber, and it is formed with a slot 30 for receiving the end of the key 24 to rotate it. The cam has a depression 32 for capturing the follower 20 in the form of a ball although the exact shape of the follower is not critical so long as rotation of the cam 18 can force the follower 20 out of the depression 32. FIG. 3 illustrates how this can be accomplished.

In the cross section of FIG. 3 the enlarged junction between the slide body block 10 and the bolt section 12 is omitted. The slide body 6 merges directly with the bolt section 12. As can be seen, the bolt section 12 fits snugly in the channel 8 of the casing 2. With the bolt section 12 in the hold position shown the cam follower 20 is held by the cam 18 in an opening 34 which extends from the cylindrical chamber 36 in the central section 16 of the casing to the channel 8, and projects into a recess 38 formed in the surface of the bolt section 12. The cam 18 has a depression 32 for receiving the cam follower 20 when rotated, clockwise as shown, through 90°. When so received, the bolt section 12 can be withdrawn from the channel 8. Also shown in FIG. 3 is a leaf spring 40 in the depression 32 which will urge the cam follower 20 into the channel 8 while accommodating it in the depression. The follower 20 is prevented from fully exiting the opening 34 by a flange 42, so it remains projecting from the opening 34 when the bolt section is withdrawn. When the bolt section is again installed in the channel 8 it engages the follower and forces it back into the opening 34 until the recess 38 is aligned therewith. The distal end of the bolt section may be formed with a bevelled edge 44 (see FIG. 1) to facilitate this.

Figure 4:
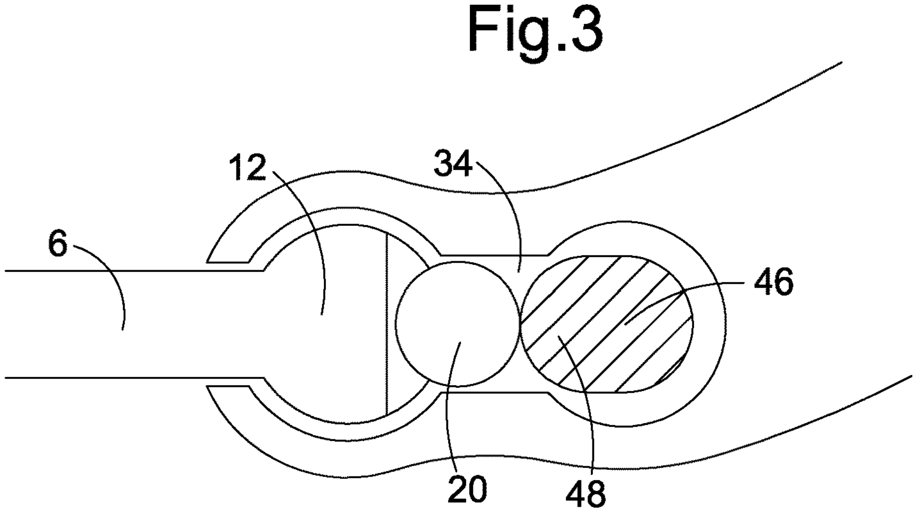
FIG. 4 is a view similar to that of FIG. 3, but showing a different cam and follower arrangement.

FIG. 4 shows an alternative cam profile in a view similar to that of FIG. 3. As can be seen, the cam 46 has an extension 48 for driving the follower 20 through the opening 34. The cam 46 drives the follower 20 further into the recess 38 than does the cam 18 in FIG. 3, and a tie or other restraint (not shown) is used to prevent the follower from exiting the opening 34.

Figure 5:
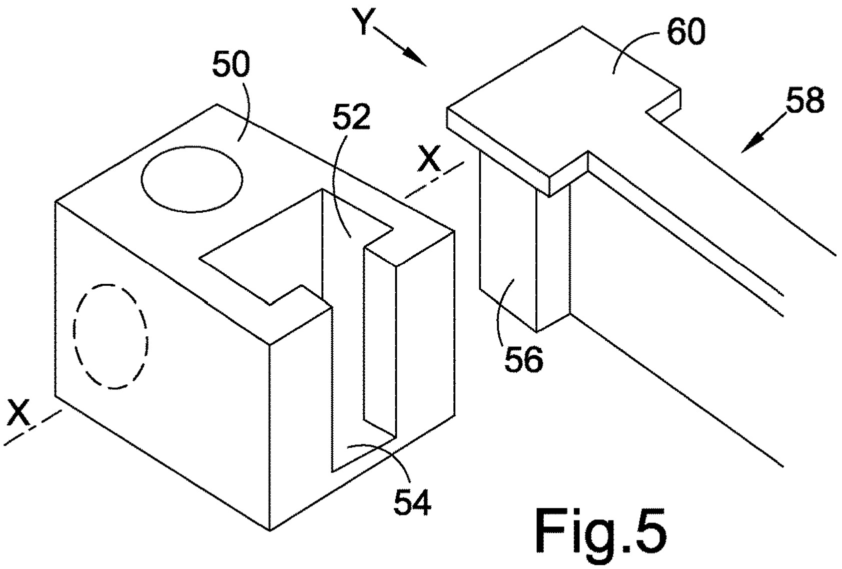
FIG. 5 illustrates one alternative form of slide and casing in a lock of the invention.

FIGS. 5 to 8 illustrate how the invention can be embodied with a polygonal bolt section and channel. FIG. 5 shows a lock casing 50 with an open sided channel 52 of rectangular cross-section closed at its lower distal end by a plate 54. The bolt section 56 of the slide 58 has a matching cross-section, and the body of the slide itself matches the open side of the channel 52 such that the bolt section 56 can be received in the channel 52. The lengths of the bolt section and channel also match so when installed, a flange 60 at the top as shown of the bolt section, in combination with the plate 54 precludes access to the channel 52.

Figure 6:
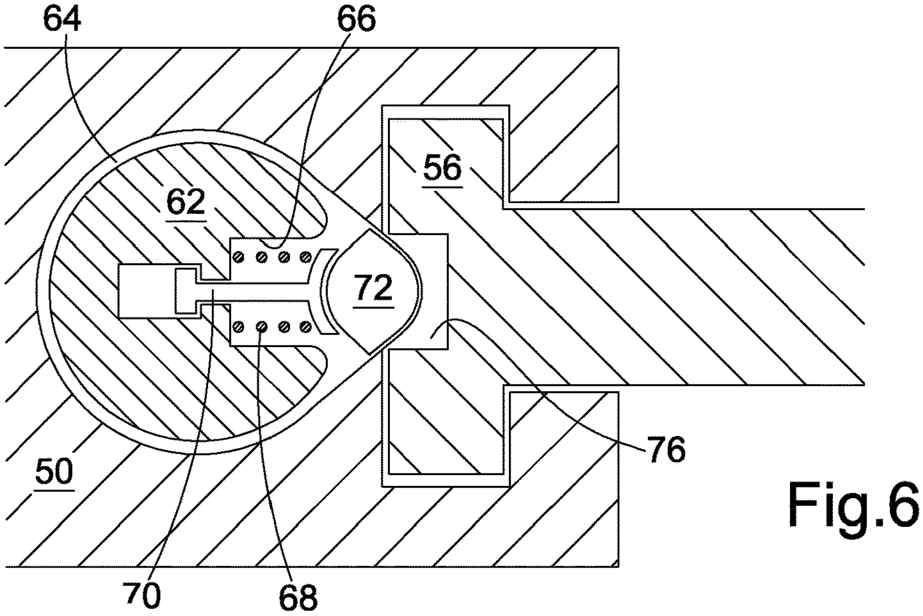
FIG. 6 is a cross-sectional view taken on line X-X of FIG. 5 to illustrate an alternative cam and follower mechanism.
Figure 7:
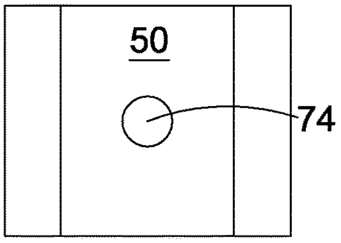
FIG. 7 shows the disposition of the opening in the casing of FIG. 5.
Figure 8:
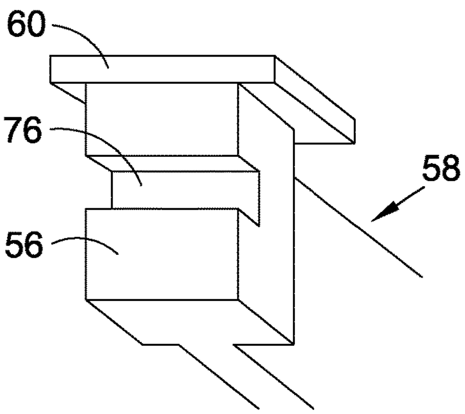
FIG. 8 is an end view on arrow Y of the slide of FIG. 5.

The cross-sectional view of FIG. 6 shows a cam and follower arrangement for holding the bolt section in its hold position. A cam 62 is rotatable in the cylindrical chamber 64, and has a bore or depression 66 in which a spring 68 supports a guide 70 carrying a cam follower 72. In the orientation shown, the spring 68 has pushed the follower 72 through the opening 74 in the casing 50 and into the recess 76 in the bolt section 56. The recess 76 appears as a rightangular opening, but will typically take the form of a lateral slot as shown in FIG. 8. With the cam oriented as shown, the bolt section is not locked in the hold position. If withdrawn the lower edge of the recess 76 will force the follower 72 into the bore 66 against the spring 68. The follower is prevented from exiting the opening 74 by the rim of the opening 74. However, when the cam is rotated away from the orientation shown the surface of the cam locks the follower in the position shown, preventing the withdrawal of the bolt section from the channel.

The chamber 64 in FIG. 6 is aligned generally parallel to the axis of the channel 52, as is the chamber 36 in FIG. 1 to the axis of the channel 8. However, this alignment is not essential. In one alternative, the chamber can extend perpendicular to the channel, as indicated in dotted outline 78 in FIG. 5.

FIGS. 9 and 10 show the proximal end of a circular cross-section channel 80 in a casing 82 similar to that shown in FIG. 1. The end face of the channel is formed with castellations 84 within a rim 86. The flange at the proximal end of the bolt section (not shown) is formed with complementary castellation features that interdigitate or mesh with the castellations 84 when the bolt section reaches its hold position. Thus, when the slide is installed with the bolt section in the channel, the engaged castellations generate two additional security features. First, a dovetail-type joint is created in the area indicated at A which tightens in response to force being applied to extract the bolt section from the channel as indicated by the arrow Z. Such force may be applied by pulling on the slide, or by chiseling for example, between the rim 86 and the castellation feature on the bolt section. Second, in the zone B pressure applied to the sides of the castellations when the bolt section is urged (by any means) in the direction of arrow Z will seek to close the channel walls as indicated by arrows C, and thereby tighten the channel about the bolt section. The sides of the castellations that create this effect can be oriented away from the open side of the channel 80 as shown. The other sides of the castellations are generally radial. Both these features result in the generation of shear forces in the materials of the channel and bolt section.

Benefits similar to those described above can be achieved at the distal end of the channel by forming castellations on a closed face 88 of the channel and forming complementary castellation features on the end face of the bolt section. It will be appreciated then, that castellations can be used in this way at either or both ends of the channel. A similar effect can also be achieved by forming splines along some or all of the length of the bolt section which interdigitate or mesh with a matching arrangement of splines on the internal channel wall. It will also be appreciated that each of these arrangements further prevents or at least restricts rotation of the bolt section in the channel, thereby further securing the lock.

The lock shown in FIG. 11 differs from that shown in FIGS. 1 to 4 by the casing 90 having a laterally extended channel section forming jaws 92 which close around the block 94 of the slide 96. The junction 98 between the bolt section 100 and the block 94 is enlarged with a cross section matching that of the extended section, thus extending the sliding engagement of the slide as a whole in the casing. The cross sections of the extended section defined by the jaws 92 and the junction 98 are larger than those of the bolt section 100 and main channel 102, and can be part-circular, polygonal or splined. For example, the ratio might be 2:1, with the diameter of the main channel being around 6 mms and that of the extended channel around 11 mms This facilitates the inclusion of additional material in the casing body in the formation of a smooth transition from the jaws 92 to the central section 104 of the casing. The junction 98 may include a passage 106 for a pin (not shown) for locking cable ends extending into openings 108 in the block 94 for example in the manner described in our Application No, PCT/GB2019/051829 referred to above. Both the main channel 102 and the extended channel section 92 are closed at their lower distal ends. When the bolt section 98 and junction 98 are installed the extended channel section provides additional security by restricting access to the main channel 102 by lock breaking tools. The additional material at the base of the jaws also provides reinforcement for the jaws against their forced separation.

The jaws 92 are shown as a single pair extending parallel to and the full length of the main channel 102. However, it will be understood that a similar benefit may be obtained by a plurality of pairs spaced along the parallel length of the main channel. This variant offers the potential additional benefit of complicating any attempt to break the lock by accessing the extended channel section.

The invention claimed is:

1. A lock, comprising:

a slide body with a bolt section along and integral with a side of the slide body, a surface of the bolt section having a recess with at least one axial boundary;

a casing having an open channel for receiving and retaining the bolt section, the bolt section and channel having substantially the same cross-section to allow for sliding engagement of the bolt section in the channel to a hold position with the cross-section of the channel enclosing the bolt section to prevent lateral withdrawal of the bolt section from the channel, the recess on the surface of the bolt section being aligned with an opening in the wall of the channel when the bolt section is in the hold position;

a cam and follower mechanism in which the cam is rotatable in the casing to at least one hold orientation at which the follower extends in the opening and into the recess when the bolt section is in the hold position to restrict movement of the bolt section along the channel; and means for rotating the cam between said at least one hold orientation and at least one other release orientation at which the follower can withdraw from the recess and release the bolt section in the channel, wherein a distal closed end of the bolt section and a closed end of the channel have matching castellations that interdigitate when the bolt reaches the hold position.

2. A lock according to claim 1, wherein the recess on the bolt section surface is in the form of a slot extending perpendicular to a bolt section axis.

3. A lock according to claim 1, wherein the cross-section of the bolt section is one of circular or polygonal.

4. A lock, comprising:

a slide body with a bolt section along and integral with a side of the slide body, a surface of the bolt section having a recess with at least one axial boundary;

a casing having a channel for receiving and retaining the bolt section, the channel having a proximal open end for receiving the bolt section and a distal closed end, the bolt section and channel having substantially the same cross-section to allow for sliding engagement of the bolt section in the channel to a hold position, the recess on the surface of the bolt section being aligned with an opening in the wall of the channel when the bolt section is in the hold position;

a cam and follower mechanism in which the cam is rotatable in the casing to at least one hold orientation at which the follower extends in the opening and into the recess when the bolt section is in the hold position to restrict movement of the bolt section along the channel; and means for rotating the cam between said at least one hold orientation and at least one other release orientation at which the follower can withdraw from the recess and release the bolt section in the channel.

5. A lock according to claim 4, wherein the bolt section has a flange that closes the proximal end of the channel when the bolt section is in said hold position.

6. A lock according to claim 1, wherein the bolt section and channel are formed with a plurality of splines that interdigitate when the bolt section is received in the channel.

7. A lock according to claim 1, wherein the bolt section has a flange that closes the proximal end of the channel when the bolt section is in said hold position, and wherein the face of the proximal end of the channel is formed with castellations and the flange at the end of the bolt section is formed with matching castellated features that interdigitate with the channel face castellations when the bolt section is in the hold position.

8. A lock according to claim 1, wherein the channel has a lateral extension forming jaws for receiving a matching enlarged junction section between the bolt section and the slide body.

9. A lock according to claim 8, wherein the cross sections of the junction section and the lateral extension are respectively larger than those of the bolt section and channel.

10. A lock according to claim 8, wherein the lateral extension comprises a single pair of jaws extending parallel to the channel.

11. A lock according to claim 8, wherein the lateral extension comprises a plurality of pairs of jaws spaced along the length of the extension parallel to the channel.

12. A lock according to claim 1, wherein an axis of the channel and an axis of the bolt section are straight, and a rotational axis of the cam is parallel to the axis that of the channel.

13. A lock according to claim 1, wherein the cam is formed with at least one depression for receiving the follower when in said at least one release orientation.

14. A lock according to claim 13, wherein a spring in said at least one recess urges the follower out of the depression.

15. A lock according to claim 13, wherein at least one circumferential edge of the depression forms a step, or is beveled or curved.

16. A lock according to claim 1, wherein the cam is formed with at least one projection for urging the follower into the recess when the bolt section is in the hold position.

17. A lock according to claim 1, wherein the means for rotating the cam comprises a key and tumbler mechanism.

18. A security device, comprising:

a lock having a casing and a slide body, the slide body having a bolt section along and integral with a side of the slide body, the casing having an open channel for receiving and retaining the bolt section, the bolt section and channel having substantially the same cross-section to allow for sliding engagement of the bolt section in the channel to a hold position with the cross-section of the channel enclosing the bolt section to prevent lateral withdrawal of the bolt section from the channel, a surface of the bolt section has a recess with at least one axial boundary, the recess being aligned with an opening in the wall of the channel when the bolt section is in the hold position;

a flexible elongate element, respective ends of the flexible elongate element being attached to the casing and the slide body;

a cam and follower mechanism in which the cam is rotatable in the casing to at least one hold orientation at which the follower extends in the opening and into the recess when the bolt section is in the hold position to restrict movement of the bolt section along the channel; and means for rotating the cam between said at least one hold orientation and at least one other release orientation at which the follower can withdraw from the recess and release the bolt section in the channel, wherein a distal closed end of the bolt section and a closed end of the channel have matching castellations that interdigitate when the bolt reaches the hold position.

19. A lock, comprising:

a slide body with a junction section and a bolt section along and integral with a side of the slide body, the junction section being between the bolt section and the slide body, a surface of the bolt section having a recess with at least one axial boundary;

a casing having an open channel and a lateral extension for receiving and retaining the bolt section and junction section, the bolt section and junction having substantially the same cross-section as the channel and its lateral extension to allow for sliding engagement of the bolt section in the channel to a hold position with the cross-section of the channel enclosing the bolt section to prevent lateral withdrawal of the bolt section from the channel, the recess on the surface of the bolt section being aligned with an opening in the wall of the channel when the bolt section is in the hold position;

a cam and follower mechanism in which the cam is rotatable in the casing to at least one hold orientation at which the follower extends in the opening and into the recess when the bolt section is in the hold position to restrict movement of the bolt section along the channel; and means for rotating the cam between said at least one hold orientation and at least one other release orientation at which the follower can withdraw from the recess and release the bolt section in the channel.

20. A lock according to claim 19, wherein the cross sections of the junction section and the lateral extension are respectively larger than those of the bolt section and channel.

21. A lock according to claim 19, wherein the lateral extension comprises a single pair of jaws extending parallel to the channel.

22. A lock according to claim 19, wherein the lateral extension comprises a plurality of pairs of jaws spaced along the length of the extension parallel to the channel.

23. A lock, comprising:

a slide body with a bolt section along and integral with a side of the slide body, a surface of the bolt section having a recess with at least one axial boundary;

a casing having an open channel for receiving and retaining the bolt section, the bolt section and channel having substantially the same cross-section to allow for sliding engagement of the bolt section in the channel to a hold position with the cross-section of the channel enclosing the bolt section to prevent lateral withdrawal of the bolt section from the channel, the recess on the surface of the bolt section being aligned with an opening in the wall of the channel when the bolt section is in the hold position;

a cam and follower mechanism in which the cam is rotatable in the casing to at least one hold orientation at which the follower extends in the opening and into the recess when the bolt section is in the hold position to restrict movement of the bolt section along the channel, a rotational axis of the cam being at an angle to an axis of the channel; and means for rotating the cam between said at least one hold orientation and at least one other release orientation at which the follower can withdraw from the recess and release the bolt section in the channel.

24. A security device, comprising:

a lock having a casing and a slide body, the slide body having a bolt section along and integral with a side of the slide body, the casing having an open channel for receiving and retaining the bolt section, the bolt section and channel having substantially the same cross-section to allow for sliding engagement of the bolt section in the channel to a hold position with the cross-section of the channel enclosing the bolt section to prevent lateral withdrawal of the bolt section from the channel, a surface of the bolt section has a recess with at least one axial boundary, the recess being aligned with an opening in the wall of the channel when the bolt section is in the hold position;

a flexible elongate element, respective ends of the flexible elongate element being attached to the casing and the slide body;

a cam and follower mechanism in which the cam is rotatable in the casing to at least one hold orientation at which the follower extends in the opening and into the recess when the bolt section is in the hold position to restrict movement of the bolt section along the channel, a rotational axis of the cam being at an angle to an axis of the channel; and means for rotating the cam between said at least one hold orientation and at least one other release orientation at which the follower can withdraw from the recess and release the bolt section in the channel.

* * * * *